Oct. 28, 1952 W. P. BOOTHROYD 2,616,047

PULSE GENERATOR

Filed March 13, 1948 6 Sheets-Sheet 1

INVENTOR.
WILSON P. BOOTHROYD
BY
Brown, Denk & Synnestvedt
AGENTS

PULSE GENERATOR

Filed March 13, 1948 6 Sheets-Sheet 2

INVENTOR.
WILSON P. BOOTHROYD
BY Brown, Denk & Synnestvedt
AGENTS

INVENTOR.
WILSON P. BOOTHROYD
BY
Brown, Denk & Synnestvedt
AGENTS

INVENTOR.
WILSON P. BOOTHROYD
BY
Brown, Denk & Synnestvedt
AGENTS

Oct. 28, 1952 W. P. BOOTHROYD 2,616,047

PULSE GENERATOR

Filed March 13, 1948 6 Sheets-Sheet 5

INVENTOR.
WILSON P. BOOTHROYD
BY
Brown, Denk & Synnestvedt
AGENTS

Oct. 28, 1952 W. P. BOOTHROYD 2,616,047

PULSE GENERATOR

Filed March 13, 1948 6 Sheets-Sheet 6

INVENTOR.

WILSON P. BOOTHROYD

BY

Brown, Denk & Synnestvedt

AGENTS

Patented Oct. 28, 1952

2,616,047

UNITED STATES PATENT OFFICE 2,616,047

PULSE GENERATOR

Wilson P. Boothroyd, Philadelphia, Pa., assignor to Philco Corporation, Philadelphia, Pa., a corporation of Pennsylvania Application March 13, 1948, Serial No. 14,691

7 Claims. (Cl. 250—36)

This invention relates to generators of generally triangular electrical pulses. While this invention is particularly applicable to multiplex signal transmitting and receiving systems, its capability of generating accurately spaced pulses of definite shape makes it applicable to timing systems in general. Because of its peculiar desirability as a portion of time multiplex systems, it will be described as constructed for application to such a system.

The principal object of this invention is to provide a generator of precisely spaced pulses of constant wave shape. A further object of this invention is to provide such a pulse generator which is readily controllable and which has a series of output terminals which are energized successively in a precisely timed sequence.

Generators of triangular pulses have been known which, however, serve only to provide approximations of truly triangular pulses. Furthermore, the length of the pulse is difficult to maintain when the spacing between pulses is large in relation to this length. It is, therefore, a further object of my invention to provide a generator of triangular pulses, which pulses are separated by spaces much longer than the pulses, including a delay line, means external to the delay line for adjusting the total delay through the system, means for generating a pulse of a definite length starting at the adjusted delay time, and means responsive to the delayed pulse for generating a signal suitable for application to the delay line.

Other objects of this invention are to provide improved details in such a system, and will be referred to hereinafter.

The manner in which these objects are achieved will be evident from the appended description taken in conjunction with the drawings in which.

Figure 1:
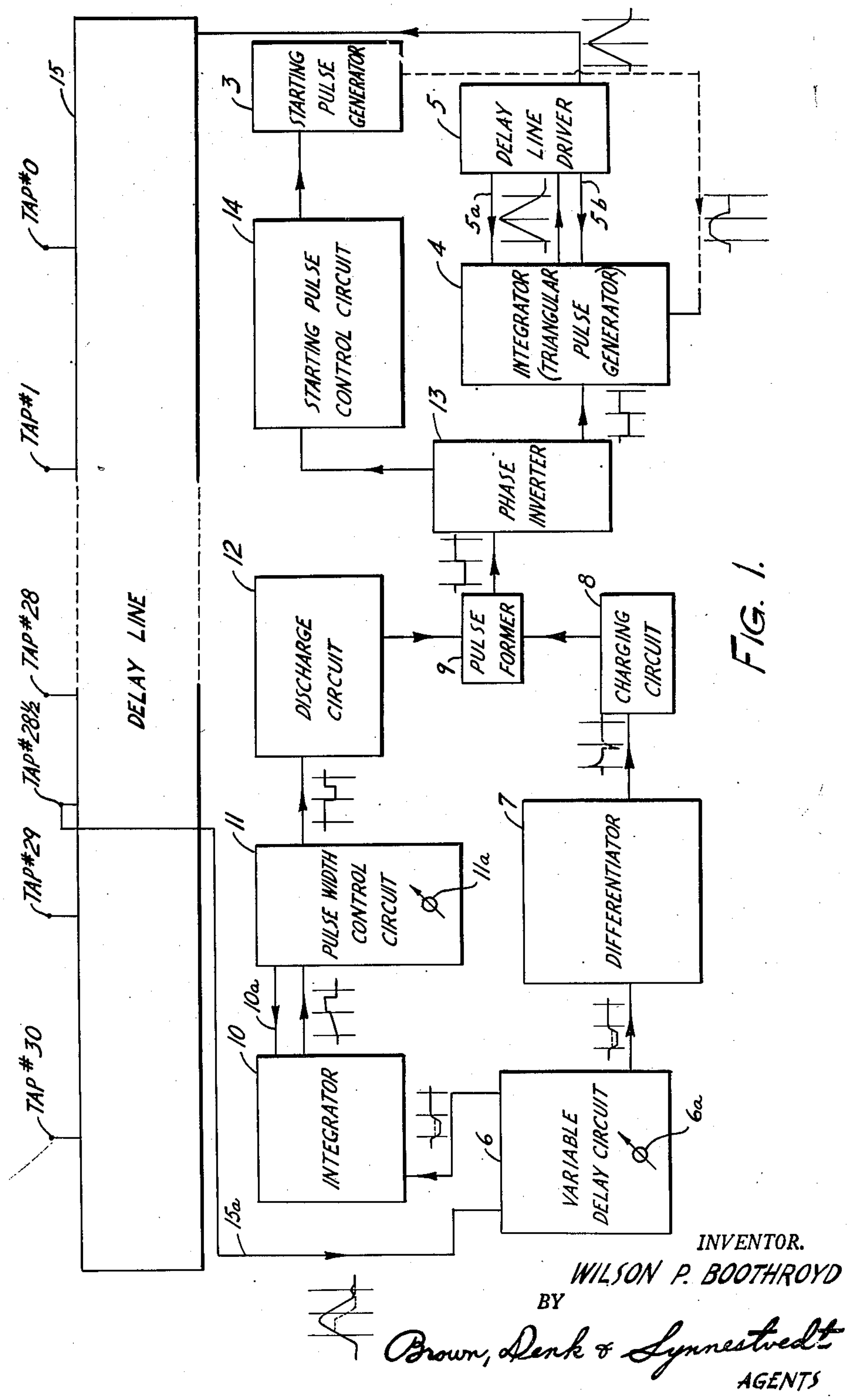
Figure 1 is a block diagram of the entire generator.

While the invention might be described in general terms, I believe it more informative to describe it in specific terms, and have done so, giving circuit constants for a practical working embodiment. The relatively detailed circuit arrangement illustrated in Figure 2 of the drawing will first be described, in rather general terms, in connection with its corresponding block diagram, Figure 1. Attention is here directed to the fact that the pulse waveforms, which are illustrated in Figure 1 as an aid in understanding the operation of the system, are, in Figure 16, drawn against a common time axis.

In Figure 1, starting pulse generator 3 is any suitable self-excited oscillator capable of generating spaced pulses at any suitable rate such as, for example, at the rate of 400 cycles per second. Generator 3 serves as the starting element of the system and is not used in normal operation. The wave shape and the duration of the pulses generated by generator 3 are not critical, and any of many known circuits providing such pulses may be used. Generator 3 supplies pulses to integrator 4 at the rate of 400 pulses per second.

Integrator 4 operates on the pulses, supplied to it by starting pulse generator 3, to generate generally triangular pulses, their rise time corresponding to the duration of the applied pulse, and their fall time being adjusted to the same duration. During the starting portion of the cycle of operation of this oscillator system, which is brief and is not a part of the active or duty-portion of the cycle, the fidelity of the triangular shape of the pulse generated by integrator 4 is not important, and although integrator 4 is provided with circuit arrangements for generating precisely triangular pulses of the type referred to above, the details of the circuit connections which provide this function need not be described until the connections of the entire circuits are described in detail. However, it may be noted at this point that there are provided feedback circuits 5a and 5b, between delay line driver 5 and integrator 4, which are important elements in the pulse shaping system.

Delay line driver 5 is supplied with a suitable triangular pulse by integrator 4. The details of this circuit 5 may be disregarded for the moment. In general, driver 5 may include a cathode loaded amplifier tube, with a cathode load resistor, driving the delay line.

Delay line 15 may consist of a suitable uniform line, or a line of lumped sections, as desired. Suitable circuit constants are given with respect to the detailed circuits shown later, but for the present it is only necessary to consider that the delay line 15 consists of a number of similar sections, each section providing about 4.16 microseconds (m. s.) delay. The delay line may suitably have a 2,500 ohm characteristic impedance, and it acts as a low pass filter, preferably with a cutoff frequency of 200 kilocycles (k. c.).

The time delay per section is herein referred to as 4.16 m. s., but it is actually $4\frac{1}{6}$ m. s. per section, which provides 125 m. s. delay for 30 sections. However, if 4.17 m. s., the nearest approximation were recited, and the user were to adjust each section to this delay, more than the available time would be required, which fact justifies the specification of 4.16 m. s., the smaller, but workable amount of delay.

The delay line 15 is provided with output connections between sections, so that a wave applied to the input of line 15 passes the output connections successively at times spaced 4.16 m. s. apart. The use made of these output connections will be referred to below, but it is only now necessary to appreciate that after the triangular wave described above has traversed the first two delay sections it has assumed substantially its ultimate shape, and that the wave shape of the signals available at the successive output terminals is sufficiently constant for the purpose.

Output terminal 15*a* of the delay line provides an output signal to variable delay circuit 6. The terminal 15*a* is connected to a point which is $29\frac{1}{2}$ delay sections from the input terminal, thus providing a total delay of almost 123 m. s. The delay line 15 is continued beyond the output point 15*a*, not only to provide a suitable termination to avoid signal reflections, but also to provide output connections suitable for use in the multiplex system in which this generator is adapted to be used.

Variable delay circuit 6 receves a triangular positive pulse from the delay line 15 and produces a negative output pulse having a steep leading edge. The time relation between the leading edge of the output pulse and the peak of the applied triangular pulse is adjustable, and delay control element 6*a* has been represented as operatng on variable delay circuit 6 to provide this time adjustment. The delay time provided by delay circuit 6 is of the order of 2 m. s. The output pulse from delay circuit 6 is applied to differentiator 7 and to integrator 10.

Because it is necessary to provide pulses of fixed repetition rate and having a definitely timed duration, the signal from delay circuit 6 is supplied to two separate channels to produce the leading and trailing edges of the required output pulse in precisely timed relation. The differentiator 7 operates upon the pulse applied to it, to provide a sharp positive pulse, corresponding in time to the leading edge of the pulse produced by the variable delay circuit 6. An additional sharp negative pulse is generated by differentiator 7, corresponding to the trailing edge of the applied pulse, but because the duration of the output pulse from delay circuit 6 is not controlled, this negative pulse is of no significance and is discarded. The output signal from differentiator 7 is applied to charging circuit 8.

Charging circuit 8 is adapted to make an abrupt change in the output potential of pulse former 9. Charging circuit 8 may be considered to be essentially a circuit for applying a potential to an energy storage device, such as a condenser, in pulse former 9 whenever a positive pulse is applied to the input of charging circuit 8. It will thus be seen that the output potential of pulse former 9 will change suddenly from one value to another at a time corresponding to the rising pulse from differentiator 7 which, in turn, corresponds in time to the leading edge of the delayed pulse emitted by variable delay circuti 6.

The sgnal channel including integrator 10 is provided to terminate the pulse initiated by pulse former 9, and thus to control its width. Integrator 10 produces an output pulse which, being the integral of a rectangular pulse derived from variable delay circuit 6, rises at an approximately uniform rate from a nominal zero level. The output pulse from integrator 10 is applied to pulse width control circuit 11.

Pulse width control circuit 11 is provided with adjustable control element 11*a* which establishes the time at which the output pulse from width control circuit 11 commences, in relation to the time at which the applied pulse commences. As will be seen hereinafter, only the leading edge of the output pulse is utilized and the trailing edge is discarded. Accordingly, although control element 11*a* is used to adjust the width of the triangular pulse to be generated by pulse former 9, no consideration need be given to the effect, on the width of the rectangular pulse generated by circuit 11, of the operation of width control 11*a*. The circuit details of pulse width control circuit 11 and width control 11*a* might suitably be similar to those in variable delay circuit 6 and its control circuit 6*a* but, as will be evident later, a modified circuit arrangement is preferable. The output pulse from circuit 11 is applied to discharge circuit 12 to cause the dscharge circuit to terminate the pulse generated by pulse former 9.

Discharge circuit 12 may be considered to be a circuit which places in the energy storage element of pulse former 9 a charge equal in value and opposite in polarity to the charge previously applied to the pulse former by charging circuit 8. The pulse former 9 is thus restored to its initial condition.

Pulse former 9 thus generates a rectangular pulse which is precisely timed in relation to the signal from delay circuit 6 and is of adjusted precise duration. The timing of its leading edge is established by the leading edge of the pulse from delay cricuit 6 through differentiator 7 and charging circuit 8, while the trailing edge of the output pulse from pulse former 9 occurs at a time delayed by pulse width control circuit 11 after the leading edge from delay circuit 6.

In the operation of the circuit the variable delay circuit 6 should be so adjusted that the total delay around the entire circuit will be exactly 125 m. s., corresponding to an 8,000 cycle repetition rate. The portion of the delay line 15 thus used will provide somewhat less than 123 m. s. delay and the delay circuit 6 approximately 2 m. s., the other elements of the feedback circuit supplying the remainder of the required delay of 125 m. s. Because it is desired to generate a triangular wave having a 4 m. s. rise time and a 4 m. s. time of fall, the width control 11a so adjusts the delay of its output pulse as to establish the length of the rectangular pulse generated by pulse former 9 at 4 m. s.

The pulse provided by pulse former 9 is applied to phase inverter 13. Phase inverter 13 may include a tube connected as a cathode follower and having two output connections, one connected to its cathode and the other to its anode. Rectangular pulses similar in magnitude but of opposite polarity are provided by these two output terminals. The output pulse supplied by the cathode connection of phase inverter 13 is applied to integrator 4. Integrator 4, functioning as a triangular pulse generator, and responsive to the rectangular pulse supplied by the device 13, supplies a corresponding triangular pulse to delay line driver 5 for application to delay line 15.

Recapitulating, it will be seen that, initially, a generally rectangular pulse, one of those supplied at the rate of 400 per second by starting pulse generator 3, produces a suitable triangular pulse from integrator 4 for application through delay line driver 5 to delay line 15. After a delay of about 123 m. s., this pulse is applied to variable delay circuit 6 whose delay time of approximately 2 m. s. is controlled by control element 6a. The leading edge of the output pulse is applied through differentiator 7 and charge circuit 8 to initiate a pulse in pulse former 9. The same leading edge, delayed by the operation of integrator 10 and width control circuit 11 for a time controlled by adjustable width control element 11a, operates discharge circuit 12 to terminate the pulse. The pulse from pulse former 9 is then applied to integrator 4 substantially 125 m. s. after the application thereto of the original starting pulse from the device 3.

It will thus be evident that I have provided a circuit for generating a series of evenly spaced pulses of substantially triangular shape separated by spaces longer than said pulses, said circuit comprising: means 4 for generating a pulse of changing amplitude during the application thereto of a control pulse; a delay line 15 having a delay time longer than the length of each of said pulses, said delay line being connected to receive a signal from said pulse generator means 4; an amplitude sensitive circuit 6 adapted to transmit only those parts of signals applied to it which are on one side of a predetermined amplitude level, said amplitude sensitive circuit being connected to receive a delayed signal from said delay line 15; an energy storage device 9; a circuit 7, 8, connected to receive a signal from said amplitude sensitive circuit 6, and adapted to change the amount of energy stored in said storage device 9 by a predetermined amount in one direction upon receiving a signal from said amplitude sensitive circuit 6; a circuit 10 for generating a pulse of changing amplitude upon the application thereto of a control signal, said circuit being connected to receive a signal from said amplitude sensitive circuit 6; a second amplitude sensitive circuit 11 connected to receive a signal from said changing amplitude pulse generator 10, and adapted to change the energy stored in said storage device 9 by the said predetermined amount, and in the direction opposite to the above-mentioned direction, upon the signal from said changing amplitude pulse generator 10 reaching a predetermined amplitude; and means for applying a control pulse derived from said energy storage device 9 to said pulse generator means 4.

There are certain conditions of adjustment of the above-described generator under which, if the oscillations were stopped by some external cause, the generator might fail to restart. To adapt this generator for unattended use, it is desirable to provide some means of restarting it automatically, whether it was stopped by external means or by deenergization of the power supply. However, it is essential that the starting mechanism shall not interfere with the normal operation of the generator. A starting system has therefore been provided, which starting system will be maintained inoperative during the whole time that the generator is functioning normally.

The initial pulse was provided by starting pulse generator 3, and an additional pulse might be expected to be generated 2,500 m. s. later. However, before the next pulse is generated by generator 3, the system has commenced to generate pulses at the rate of 8,000 per second, spaced 125 m. s. apart. It is necessary to deenergize the device 3 to prevent it from introducing a second pulse, which would not be synchronized with the 8,000 cycle pulses desired to be generated. It is for this reason that phase inverter 13 is provided with two output connections.

The output connection from the anode terminal of phase inverter 13 provides a signal to pulser control circuit 14. In response to applied signals of the magnitude of those supplied by phase inverter 13 when energized by 8,000 cycle pulses, control circuit 14 generates a negative potential which is applied to a control element of starting pulse generator 3. This negative potential indicates the presence of 8,000 cycle pulses in the pulse generating system and renders starting pulse generator 3 inoperative. Whenever, for any reason, while the system is energized, there are no 8,000 cycle pulses being generated, starting pulse generator 3 is permitted to generate 400 cycle starting pulses to restart the system. Because the units 3 and 14 of Figure 1 are used only during the start of the normal operation the connections between these units and the others are shown in dashed lines.

Figure 2:
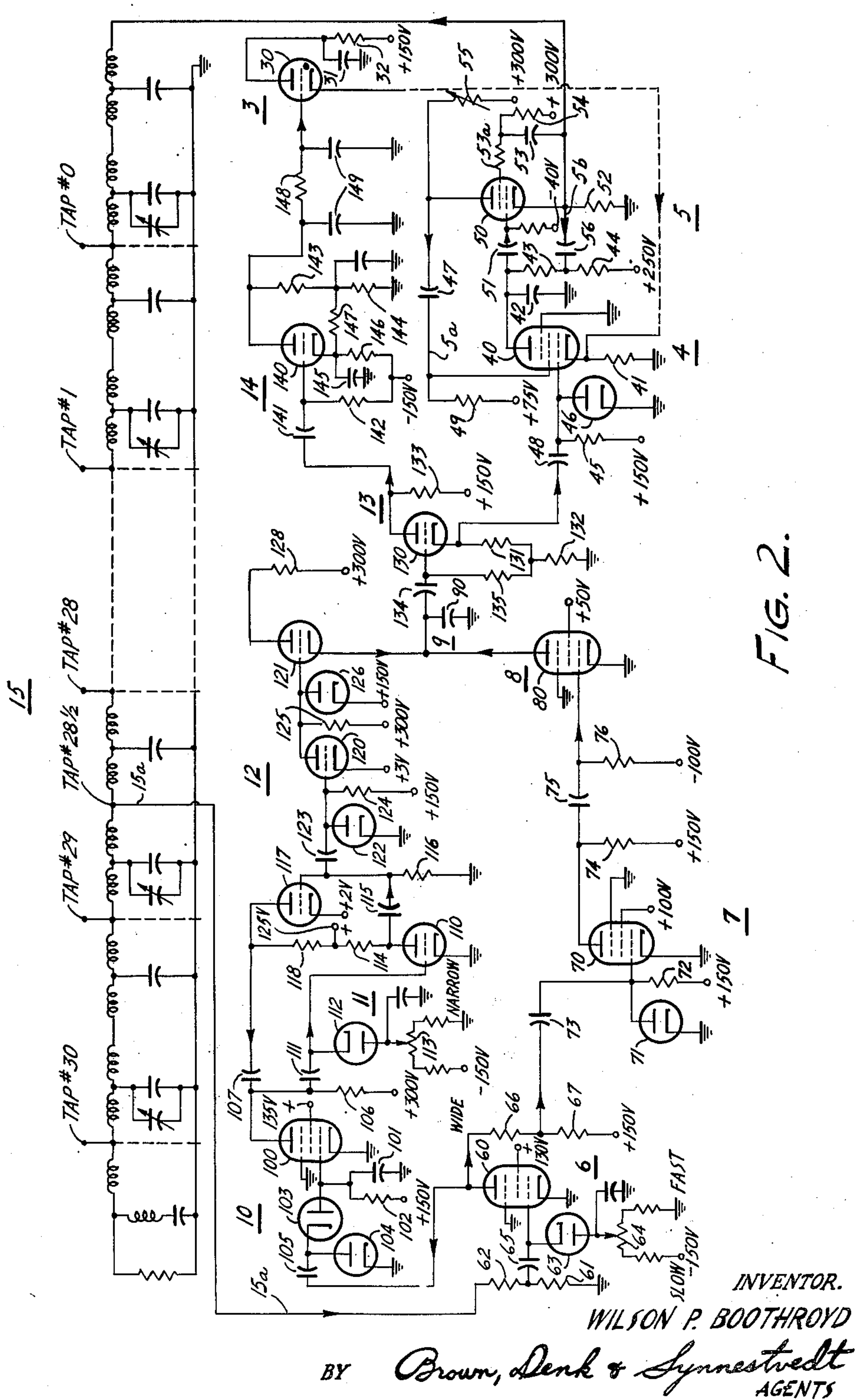
Figure 2 is a simplified wiring diagram of a typical circuit embodying my invention.

Figure 2 represents a simplified connection diagram of a typical circuit providing the functions described with reference to Figure 1 and including some refinements. To facilitate reference to the figures showing the details and the circuit constants, the elements of each portion of the circuit have been numbered with a series of reference characters, each of which starts with the number of the figure which shows the details and the circuit constants. Furthermore, the circuit diagram is laid out in the same pattern as is Figure 1, to simplify reference to the block diagram.

Figures 3, 4, 5, 6, 7:
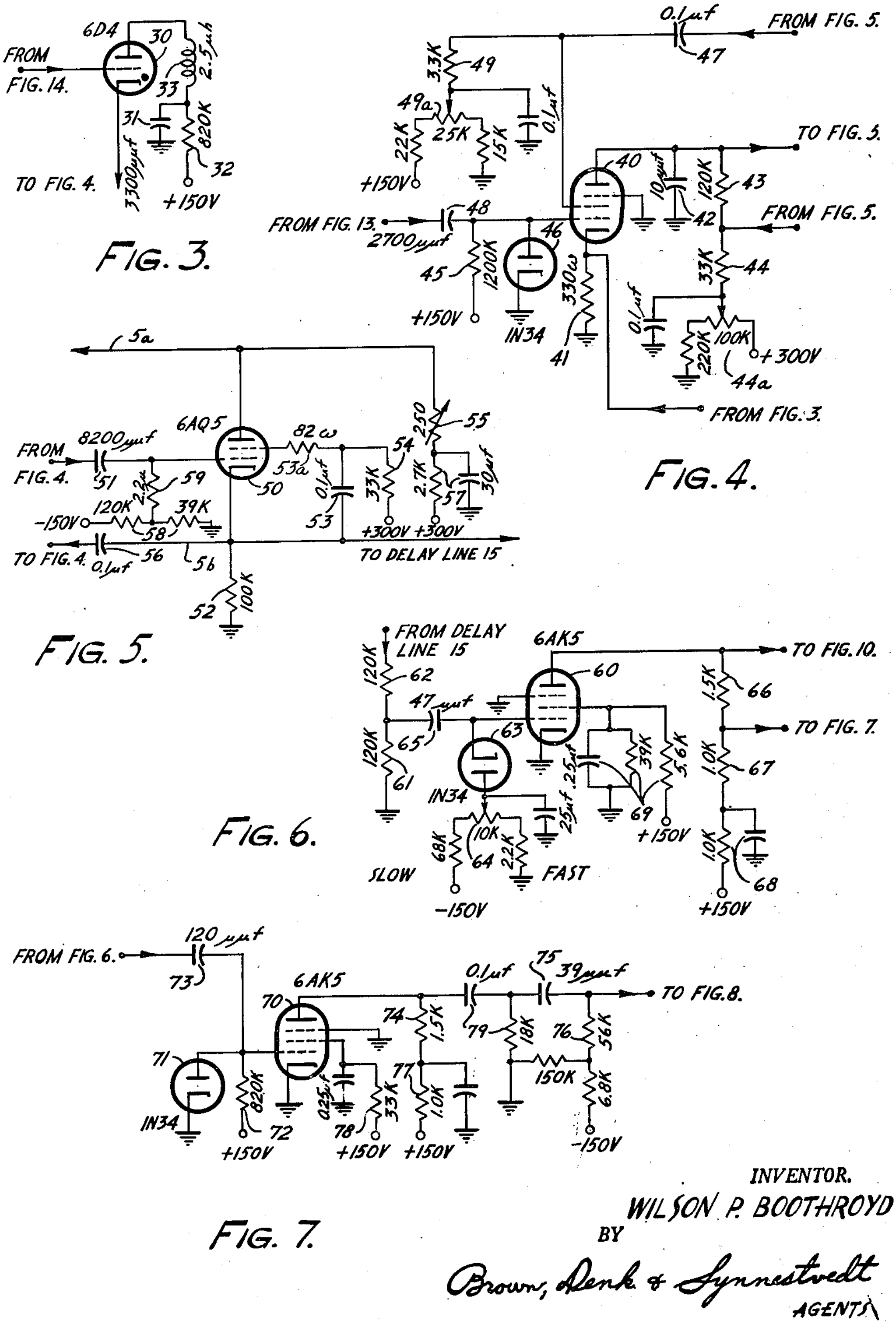
Figure 3 is a detailed circuit diagram showing the constructional constants of the starting pulse generator 3.
Figure 4 shows the details of integrator 4.
Figure 5 shows the details of delay line driver 5.
Figure 6 shows the details of variable delay circuit 6.
Figure 7 shows the details of differentiator 7.

Referring in detail to Figure 2, the pulser 3 includes a gaseous thermionic triode 30, a storage condenser 31 and a charging resistor 32. When the grid of triode 30 is not biased strongly negatively, the tube will conduct whenever a substantial plate voltage is applied to it. Assuming that condenser 31 is initially substantially discharged and that the tube 30 is nonconducting, condenser 31 will charge through resistor 32 until its potential reaches the breakdown voltage of gas tube 30. Gas tube 30 will then start to conduct, the current passing from its anode to its cathode and then to ground through resistor 41. This conduction will continue until the potential across condenser 31 is lowered to the extinction voltage of triode 30. Tube 30 will then cease to conduct. The voltage across condenser 31 will then commence to rise, and the cycle will be repeated. If a negative potential is applied to the grid of triode 30, that tube will remain non-conducting and the pulser 3 will be inactive. In normal operation the pulser 3 provides pulses which initiate operation of the pulse generator system. Pulser 3 then is rendered inactive and remains inactive until required to restart the system. The circuit constants of pulser 3 are shown in Figure 3, and are so selected as to produce pulses, having sharp edges, at the rate of approximately 400 pulses per second.

Integrator 4 converts the pulses applied to it into triangular pulses for application to delay line driver 5. During the starting operation the cathode of pentode 40 receives a positive pulse from pulser 3, although during normal operation no pulses are applied to its cathode, but rectangular negative pulses of 4 m. s. duration are applied to its control grid. The anode circuit of pentode 40 is so connected as to discharge condenser 42 when the pentode is conducting. Condenser 42 is supplied with unidirectional energy through resistors 43 and 44. Between pulses, pentode 40 is conductive to unidirectional current, which passes through resistor 44, resistor 43, pentode 40 and resistor 41. This resistance chain acts as a voltage divider to apply a predetermined potential across condenser 42. The grid of pentode 40 is held at ground potential by the positive voltage source acting through resistor 45 and across rectifier 46. When a positive pulse is applied to the cathode of tube 40, or the corresponding negative pulse to its control grid, tube 40 is rendered non-conductive. The potential across condenser 42 then rises through the time circuit consisting of resistors 43 and 44. When pentode 40 again becomes conductive, at the end of the pulse, the potential across condenser 42 returns to the value which it has between pulses. The rectifier 46, and the other rectifiers shown in the wiring diagrams may be vacuum tube diodes, but are preferably fixed crystal rectifiers.

Delay line driver 5 is supplied with the potential across condenser 42. This potential is applied through blocking condenser 51 to the control grid of tetrode 50. Tetrode 50, acting as a cathode follower, provides an output voltage across its cathode resistor 52. The value of the potential applied between the screen and the cathode of tetrode 50 is maintained relatively constant by bypass condenser 53 connected between the cathode and the screen circuit, and the screen is energized through filter resistor 54. Resistor 53*a* is used to modify the operating curve of tetrode 50 for the purposes explained below. The plate circuit of tetrode 50 is supplied with unidirectional energy through adjustable resistor 55.

It will be evident from the description set forth above that the apparatus will tend to produce an exponential rising wave followed by an exponential falling wave, the rates of rise and fall being different, due to the fact that the pentode 40 is cut off during the rising portion but is conductive during the falling portion. Such a wave, while applicable for the purposes of a delay line pulse generator generally, is not suitable for the high precision requirements of certain multiplex telephone signal systems. It is necessary to provide means for adjusting the rates of rise and fall of the triangle to substantial equality and to linearize both the rising and falling portion of the wave. The feedback connections described below, in cooperation with the electrode supply impedances supply these requirements.

As stated above, the purpose of integrator 4 and delay line driver 5 is to produce a generally triangular pulse, having a rise time equal to the duration of the pulse applied to integrator 4, and a similar decay time. The normal charge and discharge curves of condenser 42 through the resistive networks are exponential rather than linear. Furthermore, due to the change in the resistive network due to the change of pentode 40 from conductive to non-conductive condition, the rise and decay times are different. Feedback connections 5*a* and 5*b* are included between driver 5 and integrator 4 to linearize the rise and fall of the potential across condenser 42 and to equalize the rise and decay times of the pulse. In addition, resistor 53*a* is included in the screen circuit of tetrode 50 and resistor 55, included in its plate supply circuit, is made adjustable, while the value of the potential applied through resistor 49 to the screen of pentode 40 is also made adjustable. When using the values set forth in the detailed figures, Figures 4 and 5, or any other corresponding set of values, it will be found that the adjustable elements referred to above may be so adjusted that the output voltage applied across resistor 52 will be sufficiently nearly a triangular wave for the purposes of this circuit. Feedback connection 5*a* applies a negative pulse from the plate of tetrode 50 to the screen of pentode 40 through blocking condenser 47 while feedback circuit 5*b* applies a positive triangular pulse through blocking condenser 56 to the junction between resistors 43 and 44 so as to modify the wave shape of the potentials applied to condenser 42 during the generation of the triangular pulse. The resulting triangular pulse generated across resistor 52 is applied to the 2,500-ohm delay line 15.

As stated above, the generally triangular wave is applied to delay line 15. Before the wave reaches tap #1 the first effective output terminal of delay line 15, it assumes a predetermined wave shape which differs slightly from the shape of the wave across resistor 52. This new wave shape is maintained while the wave traverses delay line 15, and when the wave reaches tap #28½, twenty-nine and a half sections from the input terminal of the delay line, it still has the same shape which it had when passing the earlier output terminals, but a somewhat smaller amplitude. This generally triangular pulse from output terminal 15*a* is applied across potential divider 61—62 to variable delay circuit 6.

Delay circuit 6 is insensitive to the portions of the applied signal below a predetermined level but produces a substantial response to all applied signals above that level. It is prevented from responding to signals below the predetermined level by the negative bias on the grid of pentode 60 provided by rectifier 63, the anode of which is biased negatively to an adjustable amount by potential divider 64. Unless rectifier 63 is a crystal rectifier it should be provided with a high resistance leakage path. Blocking condenser 65 permits the rectifier 63 to thus establish the normal operating conditions of the circuit. When the applied positive triangular pulse arrives at the grid of pentode 60 no plate current flows therein until the time when the voltage of the pulse has risen to the cutoff value of the pentode, which is less than the negative voltage of the anode of rectifier 63 as established by potential divider 64. The subsequent rising portion of the positive pulse is effective in producing an amplified signal at the plate of pentode 60. The pulse reaches its maximum value and its potential commences to fall. It falls to a value corresponding to the cutoff potential of pentode 60, when no further current flows in the plate circuit. This output pulse is of the order of 2 m. s. long. It will be evident that the time at which pentode 60 commences to transmit the pulse will depend on the potential across divider 64 in relation to the time and voltage characteristics of the triangular pulse across resistor 61. The negative pulse produced by pentode 60 is available across resistors 66 and 67 in its plate circuit, acting as a potential divider. The entire negative pulse is applied to integrator 10 while the same pulse, attenuated, is applied to differentiator 7. It is to be noted that the pulses applied to integrator 10 and differentiator 7 commence at a time which is delayed with respect to the beginning of the pulse available at terminal 15*a*, which time may be adjusted by adjustment of potential divider 64, and is usually set at about 2 m. s. The arrangements in this circuit which overcome the difficulties introduced by the flow of grid current in tube 60 are described in detail with reference to Figure 6.

Differentiator 7 includes pentode 70, the grid bias of which is established by rectifier 71 and grid leak 72, the grid leak being connected to a positive potential. The input signal from delay circuit 6 is applied through blocking condenser 73 as a negative pulse, which results in a positive pulse across plate load resistor 74. The positive pulse from resistor 74 is applied through condenser 75 to grid leak 76, which is connected to a negative potential. The time constant of the condenser-resistor combination 75—76 is so small that the leading edge of the positive pulse applied thereto produces a sharply rising and falling positive pulse, while the trailing edge of the applied pulse produces a sharply falling and rising negative pulse some time thereafter. These sharp pulses are applied to charging circuit 8.

In order to provide regularity of operation of the circuit 9 which forms the pulses, it is desirable to charge it to exactly the same potential during the generation of each pulse. It is then necessary to discharge it to substantially the same potential after each pulse has been generated. The potential to which it is discharged need not be maintained as exactly as the potential to which it is charged. To provide this result it was necessary to devise a circuit operating to establish a definite potential across the condenser 90 when it is forming a pulse, and to connect the condenser 90 to a second definite potential to discharge it. The charging circuit 8 is utilized to provide the definite level of charge.

Charging circuit 8 includes pentode 80, which is so biased as to be unresponsive to applied negative pulses. Pentode 80 responds to the rising pulse. It does so by becoming conductive for the duration of the positive pulse, a very short period of time. During this time it establishes the potential across pulse-forming circuit 9, specifically across condenser 90, at a definite low value corresponding to the potential of the anode of pentode 80 when no current is flowing.

Integrator 10 is used in the part of the system which determines the length of the ultimate output pulse. This arrangement is necessary because the trailing edge of the original triangular pulse was discarded by the operation of pentode 60 of delay circuit 6. The new trailing edge is established in relation to the new leading edge by generating a pulse at a definite time after the leading edge of the pulse from delay circuit 6, and using the pulse thus generated to terminate the outgoing pulse.

It is possible to so adjust delay circuit 6 that the duration of its output pulse is less than 4 m. s. Under these conditions the output pulse cannot be applied to integrator 10 so as to produce an output pulse therefrom 4 m. s. after the beginning of the pulse from delay circuit 6. It was, therefore, necessary to devise a pulse lengthening circuit which will continue to energize integrator 10 for at least 4 m. s., regardless of the duration of the applied pulse. Integrator 10 includes a pulse lengthener which consists essentially of condenser 101, which is charged through resistor 102 from a positive source. In the absence of an applied pulse, the positive source is grounded through resistor 102 and rectifiers 103 and 104. Blocking condenser 105 permits this condition. Upon the arrival of a negative pulse, rectifier 104 is rendered non-conductive and rectifier 103 connects the negative pulse to condenser 101 to charge it negatively. Immediately upon the termination of the applied negative pulse, condenser 101 starts to draw current through resistor 102, and its potential continues to increase in the positive direction until the upper terminal of condenser 101 reaches ground potential, at which time the rectifiers 103 and 104 become conductive to hold the voltage across condenser 101 at zero. In this manner the potential applied to the grid of pentode 100 will go negative at the beginning of the applied pulse and will commence to rise after the termination of the applied pulse, about 2 m. s. later. The grid potential will continue to rise linearly, for about 4 m. s., and until it reaches zero potential.

The plate current of pentode 100 is cut off for approximately 4 m. s., this providing a widening of the 2 m. s. pulse supplied by delay circuit 6. During the 4 m. s. that the plate current is cut off, condenser 107 charges through resistor 106 in such a direction that the terminal of condenser 107 connected to resistor 106 is becoming more positive, thus providing a rising integrated pulse. The resulting integrated pulse is applied through blocking condenser 111 to pulse width control circuit 11. A feedback connection is provided through blocking condenser 107 for the purposes to be described below.

The delayed integrated pulse is applied through blocking condenser 111 to the grid of tube 110. Rectifier 112 is rendered normally non-conductive by the application of a negative potential to its anode by voltage divider 113 and continues to remain non-conductive until its cathode voltage exceeds the negative potential of its anode. The principal function of rectifier 112 is to prevent a change of reference potential of the grid circuit due to a negative charge of more than the tap potential of potential divider 113 remaining on the grid side of grid condenser 111, caused, for example, by the flow of grid current in tube 100. Rectifier 112 should either be a crystal or other rectifier with internal leakage, or should have an external leakage path. The operation of this arrangement is described with reference to Figure 6. The integrated pulse ordinarily produces no change in potential across rectifier 112, which is used to establish the large negative bias on triode 110 which prevents triode 110 from responding to the early part of the integrated pulse from integrator 10. The time at which the plate current of triode 110 commences is determined by the time when the integrated pulse reaches a value established by the setting of potential divider 113. Potential divider 113 may be adjusted over a wide range of values to thus adjust the time at which plate current commences to flow in triode 110. The pulse in the plate circuit of triode 110 bears a fixed time relation to the pulse applied to integrator 10, which is occurring simultaneously with the pulse applied to differentiator 7. In this manner the time when the output pulse from triode 110 commences may be adjusted in relation to the time when the corresponding pulse is applied to differentiator 7. In practice, the adjustment is such that the output of triode 110 is delayed for 4 m. s. after the pulse applied to differentiator 7. Triode 110 is provided with load resistor 114, which is connected to a source of positive potential. The output pulse appears as a negative voltage across resistor 114 and is transmitted through blocking condenser 115 to load resistor 116.

While the rising pulse thus generated might be suitable for application to discharge circuit 12, it is preferable to provide some means of emphasizing the leading edge of the pulse so as to assure the proper discharge of the condenser 90 exactly 4 m. s. after the condenser was charged.

The negative pulse across resistor 116 is applied to the grid of triode 117, the cathode of which is connected to a positive voltage source of small value. Resistor 118 is connected to a positive source to apply anode potential to triode 117 and to act as a load resistor. The positive pulse generated across load resistor 118 is applied through blocking condenser 107 to load resistor 106 of pentode 100. The pulse from the anode circuit of triode 117 is so polarized as to add to the voltage generated across resistor 106. However, it is to be noted that the output pulse from triode 117, being derived from the upper portion of the pulse across resistor 106, will only commence to add voltage across resistor 106 four microseconds after the pulse across resistor 106 begins to rise. The result of the regenerative feedback through triode 117 is to cause a steep rise of the pulse applied to the grid of triode 110 at exactly the time that triode 110 becomes conductive, thus enhancing the effect of this tube. The negative pulse thus produced across load resistor 116 of triode 110 will therefore have a sharply falling forward edge, even though it was derived from a sloping wave, generated by the integrator circuit 101-102. The resulting negative pulse across resistor 116 is applied to discharge circuit 12.

In spite of the care which has been applied to the system for establishing the levels, between which the pulse across condenser 90 is formed, other refinements are possible, particularly in the matter of applying a predetermined and definite voltage to the discharge tube 121 while the discharge of condenser 90 is taking place. I have provided such a further refinement which is incorporated in discharge circuit 12.

The pulse from pulse width control circuit 11, applied to discharge circuit 12, is there modified so as to provide for the discharge of condenser 90 exactly four microseconds after its potential was established by pentode 80. Discharge circuit 12 includes triode 120 and triode 121. The grid potential of triode 120 is maintained at zero by the operation of rectifier 122 except during the application of a negative pulse through blocking condenser 123. Grid leak 124 is returned to a positive source for this purpose, while the cathode of triode 120 is connected to a positive potential source of low value. Triode 120 acts to produce a positive pulse across load resistor 125 which is connected to a positive potential source. The maximum positive potential across resistor 125 is limited by rectifier 126 whose cathode is connected to a positive biasing source. The resulting positive pulse having a sharply rising leading edge and a flat top is applied to the grid of charge triode 121. Triode 121 receives its plate current through plate resistor 128 which is connected to a positive potential source. This positive source provides the plate current for pentode 80, as well as triode 121, but the plate current energy is stored in pulse-forming condenser 90. There is no time when both triode 121 and pentode 80 are conductive. In summary, it will be seen that the negative potential applied across condenser 90 by the operation of pentode 80 will be removed substantially instantaneously and to a definite level, at a time four microseconds after it was placed thereon, by the operation of triode 121 in response to the sharp leading edge and the flat top of the delayed pulse generated in delay circuit 11. The negative pulse from pulse former 9 is applied to phase inverter circuit 13.

It is to be noted that the time duration of the pulse across condenser 90 is unaffected by adjustment of potential divider 64 which adjusts the repetition rate of the pulses. Similarly, it will be evident that the repetition rate of the pulses across condenser 90 will be entirely unaffected by the adjustment of their duration by manipulation of potential divider 113.

Phase inverter 13 includes triode 130, provided with cathode load 131—132 and plate load 133 so as to generate two simultaneous pulses of opposite phase. Negative pulses applied through blocking condenser 134 are applied across grid leak 135 and output resistor 132. Grid bias is established by the flow of plate current through resistor 131. Plate current is provided by the positive source, through load resistor 133. The negative output pulse from the cathode is applied to the grid of pentode 40 of integrator 4 while the positive output pulse across resistor 133 is applied to pulser control circuit 14. The negative pulse for application to the grid of integrator 4 is applied across grid leak 45 through blocking condenser 48, that grid being normally maintained at ground potential by rectifier 46. Reference to the description of the operation of integrator 4 will show that the negative pulse applied to the grid circuit of pentode 40 is exactly the pulse required to provide the desired triangular pulse for application to delay line 15. Bearing in mind that the delay time in the delay line 15 between the time of application of the pulse to the input terminal and its arrival at the output terminal 15*a* is approximately 123 m. s. and that the delay in delay circuit 6 is so adjusted that the total delay between the arrival of the pulse at terminal 15*a* and the commencement of the new pulse generated across resistor 52 of delay line driver 5 is approximately 2 m. s., it will be recognized that potential divider 64 provides an adjustable element for setting the time between the commencement of the pulses at exactly 125 m. s. This corresponds to a repetition rate of 8,000 per second, which is a value suitable for pulse transmission of signals up to 3,900 cycles per second, the upper frequency limit at which the circuit, to which this generator has been applied, is adapted to operate.

In providing means for rendering the starting circuit inactive during the normal operation of the generator, it is preferable to have some simple and reliable means which ascertains that the generator is operating at the normal frequency and renders the starting circuit inactive.

The connection between cathode follower 13 and pulser control circuit 14 has been drawn as a dashed line to emphasize the fact that it is not part of the normal pulse generating system, but is simply auxiliary. The positive pulse across resistor 133 is applied through blocking condenser 141 to the grid of triode 140 across grid leak 142. To simplify the direct current potential relations in the plate circuit of triode 140, the plate circuit is returned to ground through resistor 143 and time circuit 144, while the grid and cathode are returned to negative potentials. The cathode is grounded through bypass condenser 145, and bias resistor 146 is provided with current through resistor 147 as well as through tube 140. The bias arrangement is such that triode 140 is normally non-conductive. Tube 140 conducts when a positive pulse is applied to its grid circuit, thus producing a pulse, which is negative with respect to ground, across resistor 143. This negative pulse is applied through resistor 148 to the grid of pulser tube 30. Condensers 149 store this negative potential, which discharges slowly through resistors 143 and 144. The discharge time is made longer than 125 m. s., which means that during normal operation of the generator a sufficient negative potential will be maintained on the grid of triode 30 to prevent the generation of pulses by pulser 3. The discharge time of condensers 149 is so adjusted, however, that it is shorter than 2,500 m. s., which is the time between the pulses normally generated by pulser 3 in the absence of negative voltage on the grid of triode 30. This arrangement permits pulser 3 to generate pulses at a 400-cycle rate until the main oscillating system goes into operation, establishing and maintaining a sufficient negative bias to stop the operation of pulser 3.

The approximate values of the potentials at the supply points are set forth in the wiring diagram of Figure 2. The detailed figures, 3 to 15 inclusive, give all the necessary values, including the tube types and the values of the decoupling networks, for a practical working embodiment. All of the voltages indicated on the detailed figures may suitably be obtained from a regulated power supply having output terminals supplying +300 volts, +150 volts, and −150 volts, the remaining terminal being grounded. The values of the components have been indicated in many cases as odd values. The reason for this is that, in practice, the color coding which designates the value of each of these components is such that the selected values are more easily recognized than similar components having round number values. It is to be understood, of course, that, unless a value is indicated as critical, it may be considered to be approximate, and a component having a value within 10 or even 20 percent of that specified can be expected to be suitable.

In view of the facility with which reference may be had to the descriptions of the construction and functions of the various portions of the circuit, by referring to Figure 2, these descriptions will not be repeated during the discussion of Figures 3 to 15.

Figure 3 shows the constructional constants of the starting pulse generator 3. The only element as yet undescribed is choke 33. Choke 33 serves to prevent undesired radio frequency oscillations in the circuit including gas tube 30, without interfering with the useful functions of this circuit.

Figure 4 shows the details of integrator 4. Potential divider 44*a* adjusts the supply potential applied through resistors 44 and 43 to charge condenser 42 during the time that pentode 40 is cut off. The amplitude of the resulting charge on condenser 42 depends on the setting of potential divider 44*a*. The voltage fed back from delay line driver 5 to the junction between resistors 43 and 44 serves to modify the supply voltage during the time when a triangular pulse is being formed. This feedback assists in linearizing the rise and fall portions of the triangular pulse. The screen of pentode 40 is supplied with potential through resistor 49. The potential divider 49*a* sets the normal operating voltage of the screen and thus controls the plate current of pentode 40 during the time that it is conducting. The setting of potential divider 49*a* thus has an effect on the shape of the fall of the triangular pulse, but it has no effect on the shape of the rise, because pentode 40 is cut off during the rise time. In addition, a negative triangular pulse corresponding in time to the output pulse of driver 5, but of reduced amplitude, is fed back through condenser 47 and across resistor 49, and is applied to the screen of pentode 40, to further modify the falling portion of the triangular pulse.

Referring to Figure 5, the details of the plate decoupling circuit 57 are illustrated. In addition, potential divider 58 is shown as providing the potential for the grid of tetrode 50 through grid leak 59.

Figure 6 shows the details of variable delay circuit 6. The values of plate decoupler circuit 68 and screen potential supply circuit 69 are indicated on the diagram. During normal operation of the circuit, the amplitude of the positive peaks of the applied triangular pulses may be sufficient to overcome the negative bias supplied by potential divider 64, and to cause the flow of grid current in tube 60. This will cause the grid side of condenser 65 to charge negatively, and this charge will be added to the bias nominally established by potential divider 64, and the sum of these voltages will control the amplitude level at which the next pulse will produce plate conduction in pentode 60. The delay time is controlled by the effective grid bias on tube 60. Therefore, if no provision is made to overcome it, the presence of this negative charge will result in a change of the time at which output of delay circuit 6 will commence, in response to the incoming wave. This will result in a change in the delay time in circuit 6. This means that changes in other elements of the circuit than potential divider 64 can modify the delay time, and therefore the repetition rate, which makes precise adjustment difficult. I have, therefore, found it desirable to provide means for establishing a definite level above which the conducting point of tube 60 may be adjusted, so as to avoid interlocking of controls. The apparatus providing this result is incorporated in delay circuit 6, and also in pulse width control circuit 11, where the same problem arises. Rectifier 63 is provided with a negative potential on its anode by potential divider 64. The normal leakage of rectifier 63 will initially bias the grid of pentode 60 to the same potential as that of the tap on voltage divider 64, thus charging condenser 65. In the absence of a pulse, therefore, there is no potential across rectifier 63. After the grid of tube 60 has been driven up to zero bias by the incoming pulse, and condenser 65 has thus been charged negatively on the grid side, the amplitude of the pulse will fall, the charge remaining on condenser 65. The rectifier 63 is so poled as to prevent the grid side of condenser 65 from becoming more negative than the voltage of potential divider 64, so when the sum of the condenser voltage and the instantaneous voltage of the applied wave reach the voltage of the potential divider 64, rectifier 63 commences to conduct, and holds the grid of tube 60 at this potential. Condenser 65 thus discharges through rectifier 63, permitting the grid bias to return to the original datum level. This datum level thus applies to each pulse received from delay line 15, which renders the circuit conditions uniform.

Figure 7 shows the details of differentiator 7. Plate decoupler 77 and screen decoupler 78 are illustrated and the values are specified. Network 79 acts as a coupling network in supplying the pulse to charging circuit 8, and also serves to supply suitable negative grid operating potentials to pentode 80.

Figure 8:
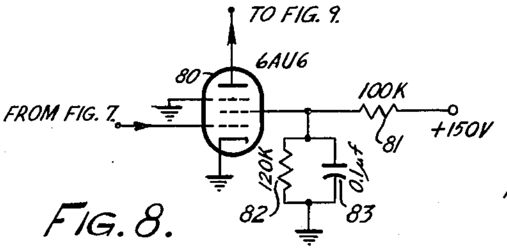
Figure 8 shows the details of charging circuit 8.

Figure 8 shows the constructional constants of charging circuit 8. The potential divider consisting of resistor 81 and resistor 82 supplies a suitable low screen voltage for pentode 80. Condenser 83, in conjunction with resistors 81 and 82, serves to decouple the screen current from the power supply. It is to be noted that pentode 80 is normally nonconductive and is only rendered conductive upon reception of a positive pulse from differentiator circuit 7. Upon becoming conductive, pentode 80 connects the upper terminal of pulse forming condenser 90 substantially to ground.

Figure 9:
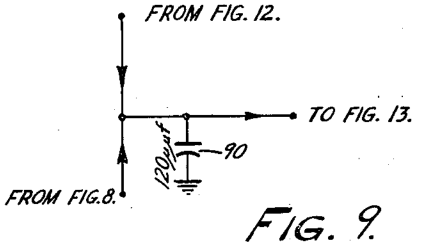
Figure 9 shows the details of pulse former 9.

Figure 9 shows pulse forming condenser 90 which is illustrated separately to emphasize the significance of its functions.

Figure 10:
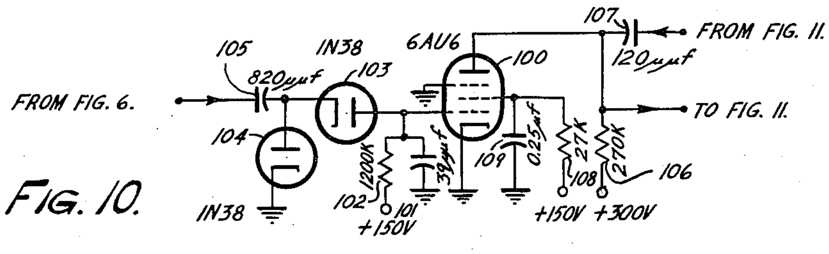
Figure 10 shows the details of integrator 10.

Figure 10 shows the constructional details of integrator 10. The screen decoupler circuit consisting of resistor 108 and condenser 109 is illustrated. It is to be noted that the load impedance into which pentode 100 works is apparently the 270,000 ohm plate resistor 106. However, whenever triode 110 of pulse width control circuit 11 is conducting, triode 117 of that circuit is feeding back, by way of capacitor 107, a voltage to resistor 106 which adds to the voltage supplied thereto by tube 100. Considering the alternating current conditions in this circuit, the actual load of tube 100 is load resistor 118 in control circuit 11, as modified in effect by the operation of feedback tube 117 in that circuit.

Figure 11:
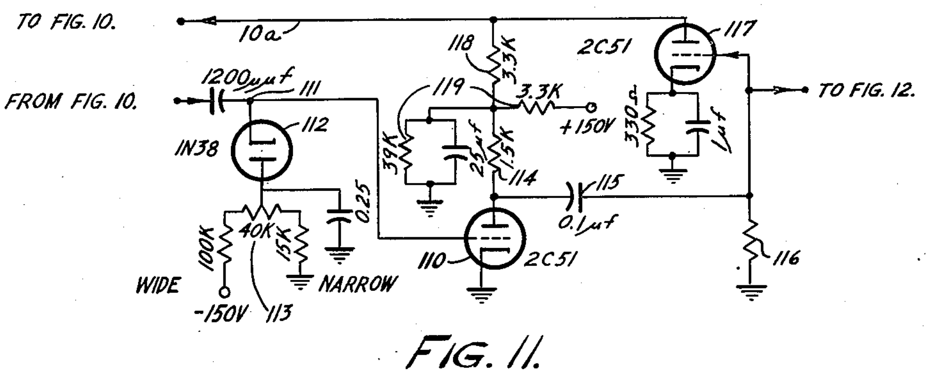
Figure 11 shows the details of pulse width control circuit 11.

Referring to Figure 11, rectifier 112 performs the same functions as those described above with reference to rectifier 63 in Figure 6. The plate potential divider and decoupler 119 is illustrated in detail, and the cathode biasing circuit for triode 117 is also shown.

Figure 12:
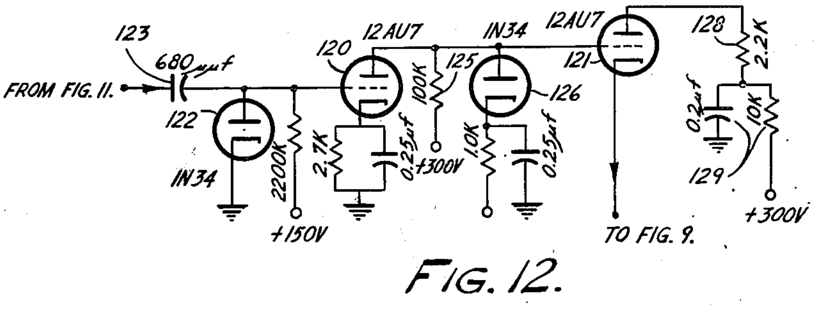
Figure 12 shows the details of discharge circuit 12.

Referring to Figure 12, which shows the details of discharge circuit 12, it is to be noted that the value of resistor 125 is critical and should be held within 5 percent. This is because the amount of charge removed from pulse forming condenser 90 during the operation of triode 121, depends on the amount of grid excitation voltage supplied to triode 121 across resistor 125. The plate decoupling network 129 for tube 121 and the cathode biasing network for tube 120 are shown in detail.

Figure 13:
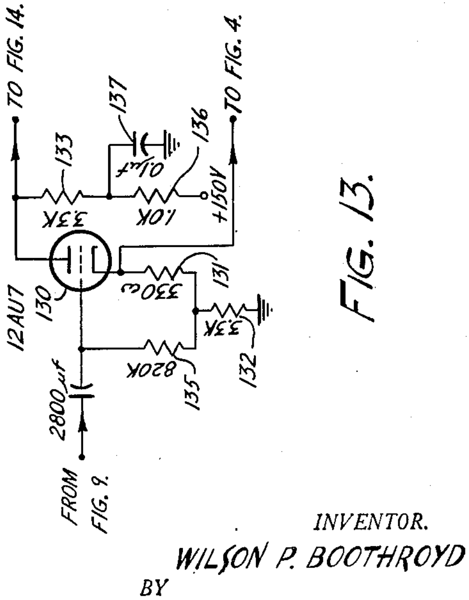
Figure 13 shows the details of phase inverter 13.

Figure 13 shows the details of phase inverter 13. The plate supply decoupling circuit consisting of resistor 136 and condenser 137 is shown in detail.

Figure 14:
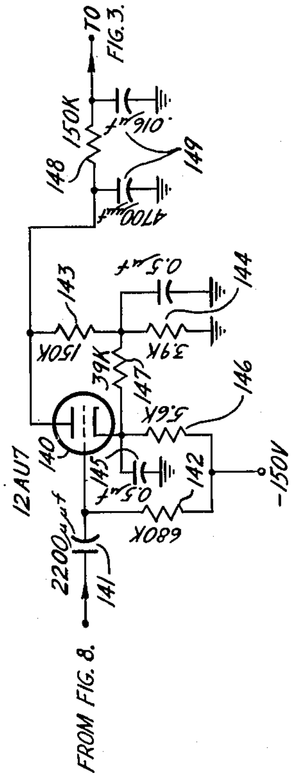
Figure 14 shows the details of starting pulser control circuit 14.

The details of Figure 14 have all been described above with reference to Figure 2.

Figure 15:
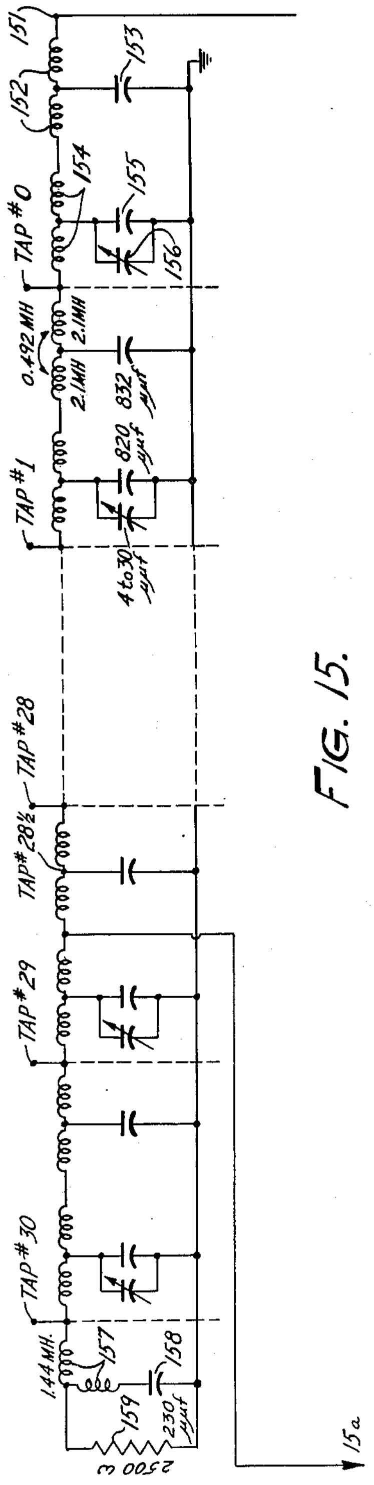
Figure 15 shows the details of delay line 15.

The constructional details of delay line 15 are shown in Figure 15. As stated above, this delay line acts as a 200 k.c. low-pass filter having a characteristic impedance of 2,500 ohms. It consists of 31 similar sections having the values set forth in the illustration. As set forth above, each section provides a delay of four and one-sixth microseconds. Input terminal 151 supplies energy to the first half of the input section, which half-section comprises inductances 152 and shunt condenser 153. The second half-section consists of series inductances 154 having the same values as inductances 152, and shunt condenser 155, which is padded by padding condenser 156. In adjusting the delay line for normal operation, the padding condenser 156 of each section is adjusted, the adjustment being made with respect to overall delay rather than delay per section. This is to prevent accumulating an error in the delay time. The other sections of the delay line have similar constants, and the delay line is provided with a termination consisting of series and shunt inductances 157 of equal value, shunt condenser 158, and load resistor 159. In practice, potential dividers having an overall resistance of the order of 100,000 ohms, many times the characteristic impedance of the line, are shunted from each tap point to ground. Signals of suitable amplitude are available across these potential dividers for use in the multiplex signal system with which this generator is adapted to operate. After the applied triangular wave has traversed the first two sections and has arrived at tap #1, it has assumed substantially its ultimate shape, and no significant change occurs in this shape at least until after the wave has passed the middle of section 29. As stated above, the wave is taken off the line at a point designated tap #28½ and supplied to variable delay circuit 6. By selecting this particular tapping point on the line, the changes which occur in the remainder of section 29 and in section 30, due to the reflections from the terminating sections, produce no harmful effect on the wave supplied to the conductor 15*a*.

While the termination illustrated, and consisting of elements 157, 158 and 159 does not completely avoid reflections, it is entirely adequate for the purpose. The wave at tap #30 is subject to about the same amount of irregularity as is the wave at tap #1. Another section may be included between tap #30 and the termination, if desired. It is unnecessary to provide a termination at the input end of the line. Terminal 151 is energized by delay line driver 5 across a 100,000-ohm resistor 52, at appropriate times. The effective impedance of tetrode 50 is small compared to 100,000 ohms during its conduction period. During the remainder of the cycle, tetrode 50 is cut off and the input end of the delay line 15 is shunted by 100,000-ohm resistor 52.

The values utilized in a suitable delay line are set forth in Figure 15. It is to be noted that if the values of the elements of the delay sections are not held within tolerances of plus or minus one percent, difficulties in the way of irregular operation may be encountered. The mutual inductances should also be carefully adjusted.

In order to understand the use to which this system is applicable and the requirements which must be met, brief reference will be made to the remaining portions of the system. These remaining portions will not be fully disclosed herein, as they are described in detail in my copending application, Serial No. 70,951, filed January 14, 1949.

Briefly, a modulator circuit is connected to every tap on delay line 15, except to taps #0 and #28½. Each of the modulators is also connected to receive an audio signal from a signal channel through a low-pass filter having a cut-off frequency of 3,900 cycles or less. The outputs of the modulators are combined in a single multiplex output circuit. It will thus be seen that, in essence, the pulse traversing the delay line acts as a switching agent to switch the associated modulators on and off at the proper times to apply samples of the incoming signals to the multiplex circuit in a precisely timed sequence.

Figure 16:
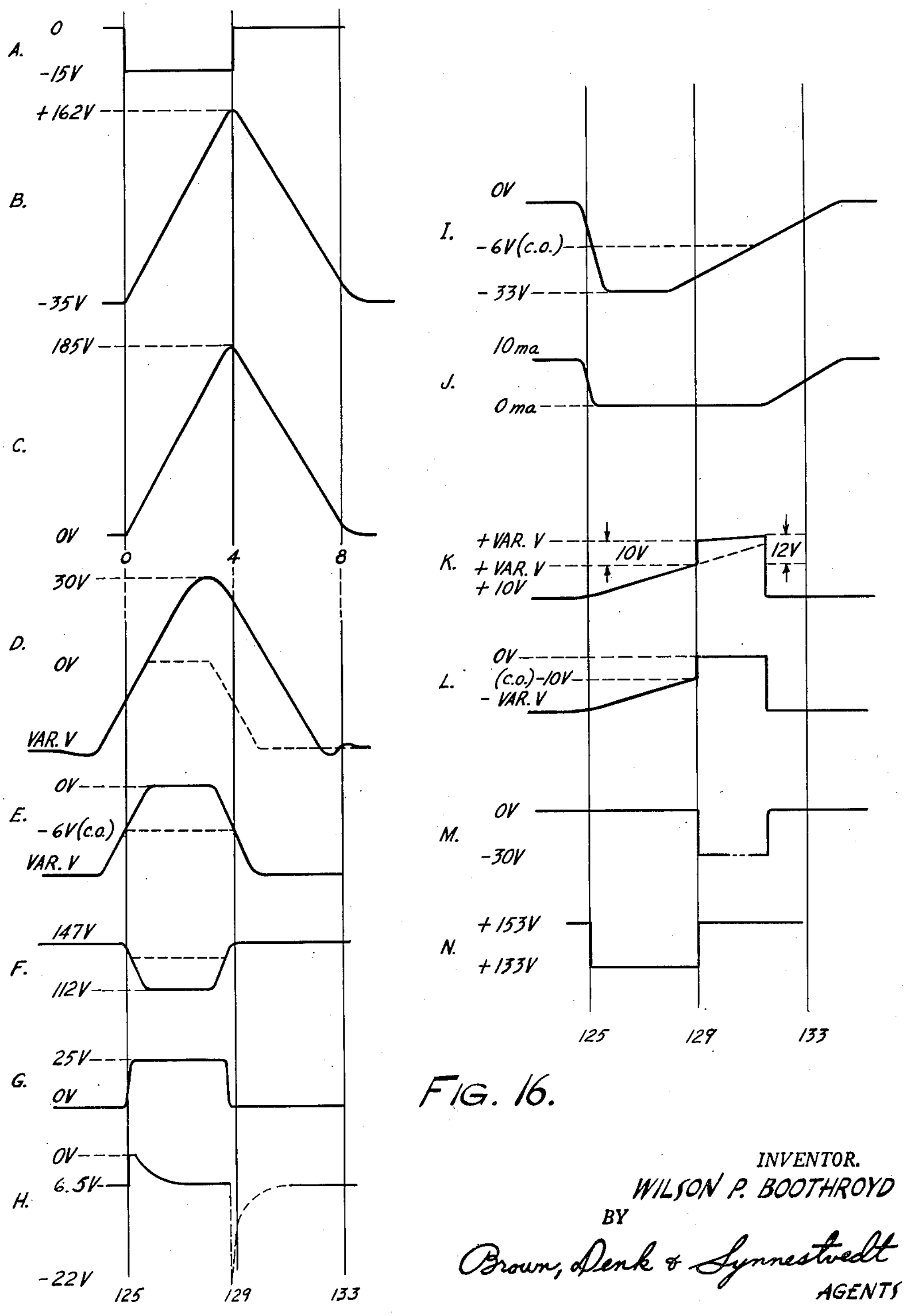
Figure 16 shows the shapes and relative timing of the waves occurring in various parts of the system.

Figure 16 shows the wave shapes existing in the various parts of the system, with approximate voltage values. Curve A shows the shape of the pulse on the grid of tube 40 of integrator 4 during normal operation. Curve B shows the pulse fed through condenser 51 to the grid of driver tube 50. It is to be noted that curve B is derived from curve A by the operation of the integrator system including condenser 42 in cooperation with feedback through feedback connections 5*a* and 5*b*. Curve C shows the triangular pulse fed to the delay line 15.

All of the above pulses are represented on a time scale starting at the time $t=0$. The remaining curves of Figure 16 are drawn on a time scale starting at $t=125$ m.s. They represent either the same pulse shown in curve C after it has traversed the delay line, or the immediately preceding pulse which serves to inititate the pulse shown in curve A.

Curve D shows the shape of the pulse in output connection 15*a* of the delay line. The modification of the shape of this pulse from that of curve C occurs almost entirely in the first portion of the delay line up to tap #0. Curve D, therefore, represents the shape of the pulses available at all of the taps. Curve E shows the wave shape on the grid of delay tube 60, as modified by the operation of condenser 65 and grid conduction in tube 60. The top of the wave has been limited and the falling portion is steeper than that of curve D. The grid cut-off voltage of tube 60 is indicated by a dashed line. Curve F shows the plate voltage of tube 60 and the shape of the wave transmitted to differentiator 7 and to integrator 10.

Curve G shows the plate voltage of tube 70, as applied to the differentiator circuit consisting of condenser 75 and resistor 76. Curve H shows the voltage across resistor 76, as applied to the grid of charge tube 80. Because the tube 80 is operating with sufficient negative potential on the grid to keep it normally cut off, it only responds to the rising portion of the wave H. The portion below the normal level is shown in dashed lines, to indicate that it is ineffective in operating tube 80.

Curve I shows the voltage applied to the grid 100 of integrator 10, as derived from delay circuit 6 and modified by the pulse stretcher consisting of condenser 101, resistor 102, rectifiers 103 and 104, and condenser 105. The cut-off grid voltage of tube 100 is indicated as a dashed line. Curve J shows the plate current of tube 100. Curve K shows the voltage at the junction between the anode of tube 100 and condenser 107. Condenser 107 will start to charge as soon as the plate current of tube 100 commences to fall. As soon as tube 100 reaches cut-off, the rate of charge of condenser 107 will be such that the voltage will rise substantially linearly. In the absence of tube 117, this linear curve would continue until the tube 100 would begin to draw plate current again, at which time condenser 107 would begin to discharge instead of charging.

Referring, for the moment, to curve L, which shows the voltage on the grid of tube 110, it will be noted that the voltage rises substantially along a straight line until the cut-off grid bias voltage of tube 110 is reached. This cut-off voltage is indicated in curve L by the dashed line. As soon as tube 110 commences to conduct a signal, it is applied to the grid of tube 117, the anode circuit of which drives the other terminal of condenser 107 positive. As shown in curve K, this results in an almost instantaneous rise in the voltage at the terminals of condenser 107. This rise continues vertically until the grid of tube 110 begins to draw grid current, as a result of which tube 110 is no longer effective as an amplifier. Tube 117, the grid of which had already been driven considerably negative, is thus held at the same signal level and substantially no further signal is fed back to condenser 107. Only enough signal is fed back to condenser 107 to permit a rise in the plate voltage of tube 100 at a low rate. This rise in voltage will be applied to condenser 111 and will maintain the grid of tube 110 at the grid current point. This explains the difference between curves K and L. As soon as the plate circuit of tube 100 commences to draw current, it starts to discharge condenser 107 and the voltage on the grid of tube 110 starts to drop. This results in the beginning of the positive signal across load resistor 114, which is applied to the grid of tube 117, to increase its plate current. This increase in plate current produces a negative voltage which is applied to condenser 107. In this way both the plate circuit of tube 100 and the cooperative feedback relations of tubes 110 and 117 contribute to the rapid fall of the voltage on the grid of tube 110, so that it is cut off almost instantly.

Curve M shows the voltage on the grid of tube 120. It is to be noted that the voltage falls sharply at a time 4 m. s. after the rising pulse shown in curve H. The length of the pulse, shown in curve M, is of no moment and is determined by the time when plate current commences to flow in tube 100.

Curve N shows the potentials across condenser 90, as applied to the input of phase inverter 13. The falling portion of the pulse is established by the operation of tube 80, under the influence of the rising pulse shown in curve H. The condenser 90 is then left floating and unable to either charge or discharge. At a time 4 m. s. later, it is discharged by the operation of tube 121 under the influence of the plate current wave of tube 120, corresponding to the grid wave shown in curve M. The pulse shown in curve N is applied, through phase inverter 13, to integrator 4, where it appears in the form shown in curve A.

It will be evident that the apparatus of my invention will provide the same function as a radial beam switching tube when used for switching purposes, but that the various elements may be much more readily adjusted and maintained by the operators.

Although my invention has been described with particular reference to a specific, preferred embodiment, it will be apparent that the invention is capable of other forms of physical expression, and is, accordingly, limited only by the spirit and scope of the appended claims.

I claim:

1. In a circuit for generating a series of evenly spaced pulses of substantially triangular shape separated by spaces longer than said pulses, said circuit comprising: a first means responsive to the application thereto of a control pulse for generating a pulse of changing amplitude; a delay line having a delay time longer than the length of each of said pulses, said delay line being connected to receive a signal from said first pulse generating means; an amplitude-sensitive circuit adapted to transmit only those parts of signals applied to it which are on one side of a predetermined amplitude level, said amplitude-sensitive circuit being connected to receive a delayed signal from said delay line; an energy storage device; a circuit connected to receive a signal from said amplitude-sensitive circuit, and adapted to change the amount of energy stored in said storage device by a predetermined amount in one direction upon receiving a signal from said amplitude-sensitive circuit; a second means for generating a pulse of changing amplitude upon the application thereto of a control signal, said last-named means being connected to receive a signal from said amplitude-sensitive circuit; a second amplitude-sensitive circuit connected to receive a signal from said second pulse generating means, and adapted to change the energy stored in said storage device by the said predetermined amount, and in the direction opposite to the above-mentioned direction, upon the signal from said changing amplitude pulse generator reaching a predetermined amplitude; and means for applying a control signal derived from said energy storage device to said first pulse generating means.

2. In a circuit for generating a series of evenly spaced pulses of substantially triangular shape separated by spaces longer than said pulses, said circuit comprising: a first integrator circuit for generating a linearly rising wave during the application thereto of a rectangular control pulse; an amplifier circuit cooperatively associated with said first integrator for producing a linear wave falling at the same rate as said rising wave upon the termination of said rising wave; a delay line having a delay time longer than the length of each of said pulses, said delay line being connected to the output of said amplifier; a first amplitude-sensitive circuit adapted to transmit only those parts of signals applied to it which are above an adjustably predetermined amplitude level, said amplitude-sensitive circuit being connected to receive a delayed triangular signal from said delay line; a circuit adapted to differentiate signals applied thereto, said circuit being connected to receive signals from said first amplitude-sensitive circuit; a condenser; a circuit adapted to charge said condenser upon receiving a signal, and connected to receive signals from said differentiator; a second integrating circuit for producing an integrated pulse of longer duration than the pulses applied thereto, said second integrating circuit being connected to receive pulses from said first amplitude-sensitive circuit; a second amplitude-sensitive circuit connected to receive integrated pulses from said second integrating circuit; a circuit adapted to discharge said condenser upon receiving a signal, and connected to receive signals from said second amplitude-sensitive circuit; a second amplifier connected to respond to a signal present across said condenser by producing a rectangular pulse signal; and means for applying the response signal of said second amplifier to said first integrator circuit.

3. In a timing generator, a delay line having a selected number of output taps each of which is connected to serve as a source of timing voltage, the total time delay of said line in one direction from the input terminal thereof to the furthest tap being predetermined, a pulse-forming network, means for connecting said network to the input terminal of said delay line, normally inactive initiating means for applying a pulse to the input terminal of said delay line while said pulse-forming network is de-energized, a time-delay circuit, means for connecting said time-delay circuit to a point on said delay line intermediate said input terminal and said furthest tap, means for applying the output of said time-delay circuit to control the formation of a pulse in said network, and means responsive as a function of the formation of a pulse by said network for rendering inactive said initiating means.

4. A timing generator in accordance with claim 3, in which the delay time of said time-delay circuit combined with the time delay introduced by said pulse-forming network is substantially equal to the time delay of that portion of said delay line lying between said furthest tap and the point on said line to which said delay circuit is connected.

5. In a generator of self-sustained pulses, a delay line having a predetermined delay period between input and output terminals, said pulses appearing at the output terminal of said delay line at regularly-recurring intervals during operation of said generator, a manually-adjustable delay unit connected to the output terminal of said line so as to receive the pulses appearing at such point, a rectangular wave-forming circuit, means for differentiating the delayed pulse output of said manually-adjustable delay unit and for applying such differentiated pulses to said rectangular wave-forming circuit respectively to control the formation of the leading edges of the rectangular waves produced thereby, means for integrating the delayed pulse output of said manually-adjustable delay unit and for applying such integrated pulses to said rectangular wave-forming circuit respectively to control the formation of the trailing edges of the rectangular waves produced thereby, a generator for generating triangular pulses in response to rectangular pulses applied thereto, means for applying the output of said rectangular wave-forming circuit to said triangular pulse generator so as to develop a series of triangular pulses of precise timing and duration, and means for applying the triangular pulses thus developed to the input terminal of said delay line.

6. The combination of claim 5, in which the said manually-adjustable delay unit is responsive only to those portions of the pulses appearing at the output terminal of said delay line which are above a predetermined amplitude level.

7. The combination of claim 5, further including manually-adjustable control means located between said integrating means and said rectangular wave-forming circuit for varying the width of the rectangular waves produced thereby and hence the width of the triangular pulses developed by said triangular pulse generator.

WILSON P. BOOTHROYD.

REFERENCES CITED

The following references are of record in the file of this patent:

UNITED STATES PATENTS

| Number | Name | Date |
|---|---|---|
| 2,212,173 | Wheeler et al. | Aug. 20, 1940 |
| 2,212,967 | White | Aug. 27, 1940 |
| 2,413,063 | Miller | Dec. 24, 1946 |
| 2,413,182 | Hollingsworth et al. | Dec. 24, 1946 |
| 2,436,808 | Jacobsen et al. | Mar. 2, 1948 |
| 2,446,106 | Robertson | July 27, 1948 |
| 2,485,124 | Westcott | Oct. 18, 1949 |

OTHER REFERENCES

Article entitled "Design of Mercury Delay Lines," by T. K. Sharpless, Electronics of November 1947, pages 134–138.